(12) United States Patent
Yasui et al.

(10) Patent No.: US 11,845,489 B2
(45) Date of Patent: Dec. 19, 2023

(54) VEHICLE CONTROL APPARATUS

(71) Applicants: TOYOTA JIDOSHA KABUSHIKI KAISHA, Toyota (JP); Continental Automotive Corporation, Yokohama (JP)

(72) Inventors: Daiki Yasui, Atsugi (JP); Sho Hashimoto, Shizuoka-ken (JP); Akshay Rajendra, Frankfurt (DE); Michael Patzelt, Frankfurt (DE)

(73) Assignees: TOYOTA JIDOSHA KABUSHIKI KAISHA, Toyota (JP); CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 262 days.

(21) Appl. No.: 17/366,216

(22) Filed: Jul. 2, 2021

(65) Prior Publication Data

US 2022/0017145 A1 Jan. 20, 2022

(30) Foreign Application Priority Data

Jul. 16, 2020 (JP) .................................. 2020-121848

(51) Int. Cl.
*B62D 15/02* (2006.01)
(52) U.S. Cl.
CPC ................ *B62D 15/0265* (2013.01)
(58) Field of Classification Search
CPC .............. B62D 15/0265; B62D 15/025; B62D 15/028; B62D 15/029; B62D 5/005; B62D 5/0463; B62D 6/00
See application file for complete search history.

(56) References Cited

U.S. PATENT DOCUMENTS

| | | | |
|---|---|---|---|
| 9,953,534 B1 * | 4/2018 | Malla ..................... | G08G 1/163 |
| 11,479,240 B2 * | 10/2022 | Shimbo ............ | B60W 60/0015 |
| 2015/0220865 A1 * | 8/2015 | Acuna Agost ... | G06Q 10/06312 |
| | | | 705/7.22 |
| 2016/0137221 A1 * | 5/2016 | Mose ................... | B62D 5/0463 |
| | | | 701/41 |
| 2017/0015314 A1 * | 1/2017 | Tanase ............ | B60W 30/18109 |

(Continued)

FOREIGN PATENT DOCUMENTS

| | | | | |
|---|---|---|---|---|
| CN | 110203281 A | * | 9/2019 | ............... B62D 6/00 |
| CN | 110733500 A | * | 1/2020 | ............ B60W 30/09 |

(Continued)

*Primary Examiner* — Redhwan K Mawari
(74) *Attorney, Agent, or Firm* — Sughrue Mion, PLLC

(57) ABSTRACT

A vehicle control apparatus determines that a control start condition is satisfied when there is an object in an area of a route which the own vehicle moves and executes a steering control of steering the own vehicle to increase a yaw angle of the own vehicle with respect to a moving lane of the own vehicle and decrease the yaw angle to avoid a collision of the own vehicle with the object when determining that control start condition is satisfied. The vehicle control apparatus determines that a control termination condition is satisfied when the yaw angle becomes equal to or smaller than a predetermined yaw angle, and a steering angle of the own vehicle becomes equal to or smaller than a predetermined steering angle after starting steering the own vehicle to decrease the yaw angle in executing the steering control.

14 Claims, 8 Drawing Sheets

(56) References Cited

U.S. PATENT DOCUMENTS

| | | | | |
|---|---|---|---|---|
| 2017/0057498 A1* | 3/2017 | Katoh | ............... | B60W 30/0956 |
| 2017/0200330 A1* | 7/2017 | Gupta | ................... | G06F 3/0604 |
| 2020/0247399 A1* | 8/2020 | Tanahashi | ......... | B60W 60/0016 |
| 2020/0339111 A1* | 10/2020 | Murakami | ........ | B60W 30/0956 |
| 2021/0109535 A1* | 4/2021 | Tansey | .................. | B60W 30/09 |
| 2021/0237721 A1* | 8/2021 | Shimbo | ............. | B60W 60/0015 |

FOREIGN PATENT DOCUMENTS

| | | | | | |
|---|---|---|---|---|---|
| DE | 102016204550 A1 | * | 9/2016 | .......... | B60T 8/17557 |
| JP | 2008168784 A | * | 7/2008 | ........... | B62D 15/025 |
| JP | 2012084038 A | * | 4/2012 | | |
| JP | 2017-043262 A | | 3/2017 | | |
| JP | 2019137360 A | * | 8/2019 | ............. | B60Q 9/005 |
| WO | WO 2019082980 A1 | * | 2/2019 | ............. | B60Q 9/008 |

\* cited by examiner

VEHICLE CONTROL APPARATUS

BACKGROUND

Field

The invention relates to a vehicle control apparatus.

Description of the Related Art

There is known a vehicle control apparatus which executes a steering control of automatically steering an own vehicle to avoid a collision of the own vehicle with an object when determining that the object is on a moving route of the own vehicle, and the own vehicle probably collides with the object (for example, see JP 2017-43262 A).

The known vehicle control apparatus terminates executing the steering control when a predetermined condition is satisfied after starting executing the steering control. As the predetermined condition, a condition that the own vehicle has passed by the object, and a yaw angle of the own vehicle becomes equal to or smaller than a predetermined yaw angle, can be used.

The yaw angle of the own vehicle is an angle of a longitudinal center line of the own vehicle with respect to a moving lane of the own vehicle. The yaw angle of the own vehicle is acquired, for example, based on imaged taken by a camera provided on the own vehicle which takes the images ahead of the own vehicle.

If the yaw angle of the own vehicle is acquired, based on the images taken by the camera, it takes a certain time to complete image processing of the images. Thus, the acquired yaw angle may not correspond to the actual yaw angle. Even if the acquired yaw angle generally corresponds to the actual yaw angle, orientations of tires of the own vehicle may not be parallel with the moving lane of the own vehicle. In these cases, if executing the steering control is terminated in response to the yaw angle of the own vehicle becoming equal to or smaller than the predetermined yaw angle, the own vehicle may move in a direction toward or opposite to an adjacent lane or an oncoming lane and as a result, the own vehicle may collide with another object.

SUMMARY

The invention has been made for solving the problems described above. An object of the invention is to provide a vehicle control apparatus which terminates executing the steering control of steering the own vehicle to avoid the collide of the own vehicle with the object with preventing the own vehicle from colliding with another object.

A vehicle control apparatus according to the invention comprises (i) a sensor which detects own vehicle forward information on a situation ahead of an own vehicle and (ii) an electronic control unit. The electronic control unit is configured to determine that a control start condition is satisfied when there is an object in an area of a route which the own vehicle moves, based on the own vehicle forward information. In addition, the electronic control unit is configured to execute a steering control of steering the own vehicle to increase a yaw angle of the own vehicle with respect to a moving lane of the own vehicle and decrease the yaw angle to avoid a collision of the own vehicle with the object when the electronic control unit determines that control start condition is satisfied. In addition, the electronic control unit is configured to determine that a control termination condition is satisfied when (i) the yaw angle becomes equal to or smaller than a predetermined yaw angle, and (ii) a steering angle of the own vehicle becomes equal to or smaller than a predetermined steering angle after the electronic control unit starts steering the own vehicle to decrease the yaw angle in executing the steering control. In addition, the electronic control unit is configured to terminate executing the steering control when the control termination condition is satisfied.

Thereby; executing the steering control is terminated when the yaw angle and the steering angle of the own vehicle both become small, Thus, the own vehicle moves along the moving lane of the vehicle without turning rightward or leftward just after executing the steering control is terminated. Thus, a collision of the own vehicle with another object just after executing the steering control is terminated, can be prevented.

According to an aspect of the invention, the control termination condition may include a condition that a change rate of the steering angle of the own vehicle becomes equal to or smaller than a predetermined change rate after the electronic control unit starts steering the own vehicle to decrease the yaw angle in executing the steering control. Thereby, the condition that the change rate of the steering angle of the own vehicle becomes small, is added in as a condition of terminating executing the steering control. When the change rate of the steering angle of the own vehicle is small, it can be ensured that the own vehicle moves along the moving lane of the own vehicle without turning rightward or leftward just after executing the steering control is terminated. Thus, the collision of the own vehicle with another object just after executing the steering control is terminated, can be surely prevented.

According to another aspect of the invention, the control termination condition may include a condition that a yaw rate of the own vehicle becomes equal to or smaller than a predetermined yaw rate after the electronic control unit starts steering the own vehicle to decrease the yaw angle in executing the steering control. Thereby, the condition that the yaw rate of the own vehicle becomes small, is added in as the condition of terminating executing the steering control. When the change yaw rate of the own vehicle is small, it can be ensured that the own vehicle moves along the moving lane of the own vehicle without turning rightward or leftward just after executing the steering control is terminated. Thus, the collision of the own vehicle with another object just after executing the steering control is terminated, can be surely prevented.

According to further another aspect of the invention, the electronic control unit is configured to cancel executing the steering control when a steering torque input to a steering wheel of the own vehicle by a driver of the own vehicle becomes equal to or greater than a predetermined steering torque while the steering control is executed. Thereby, disturbing a positive steering operation performed by the driver to avoid the collision of the own vehicle with the object, can be prevented.

According to further another aspect of the invention, the electronic control unit may be configured to execute the steering control to set a moving route of the own vehicle for avoiding the collision of the own vehicle with the object as a recommended route when the control start condition is satisfied. In addition, the electronic control unit may be configured to execute the steering control to assist operations applied by a driver of the own vehicle to a steering wheel of the own vehicle to move the own vehicle along the recommended route. Thereby, the steering control is executed so as to assist a steering operation performed by the driver to avoid the collision of the own vehicle with the object.

According to further aspect of the invention, the recommended route may be a route extending in the moving lane of the own vehicle. Thereby, the steering control is executed with preventing the own vehicle from moving out of the moving lane of the own vehicle. Thus, the collision of the own vehicle with the object can be safely avoided.

According to further another aspect of the invention, the electronic control unit may be configured to cancel executing the steering control when the electronic control unit cannot set the recommended route. Thereby, the steering control is not executed when there is a probability that the collision of the own vehicle with the object cannot be avoided. Thus, wastefully executing the steering control can be prevented.

According to further another aspect of the invention, the electronic control unit may be configured to execute the steering control to set a moving route of the own vehicle for avoiding the collision of the own vehicle with the object as a target route when the control start condition is satisfied. In addition, the electronic control unit may be configured to execute the steering control to move the own vehicle along the target route. Thereby, the collision of the own vehicle with the object can be avoided by the steering control independently of the steering operation performed by the driver. Thus, the collision of the own vehicle with the object can be surely avoided.

According to further another aspect of the invention, the target route may be a route extending in the moving lane of the own vehicle. Thereby, the steering control is executed with preventing the own vehicle from moving out of the moving lane of the own vehicle. Thus, the collision of the own vehicle with the object can be safely avoided.

According to further another aspect of the invention, the electronic control unit may be configured to cancel executing the steering control when the electronic control unit cannot set the target route. Thereby, the steering control is not executed when there is a probability that the collision of the own vehicle with the object cannot be avoided. Thus, wastefully executing the steering control can be prevented.

Elements of the invention are not limited to elements of embodiments and modified examples of the invention described along with the drawings. The other objects, features and accompanied advantages of the invention can be easily understood from the embodiments and the modified examples of the invention.

DESCRIPTION OF THE EMBODIMENTS

Figure 1:
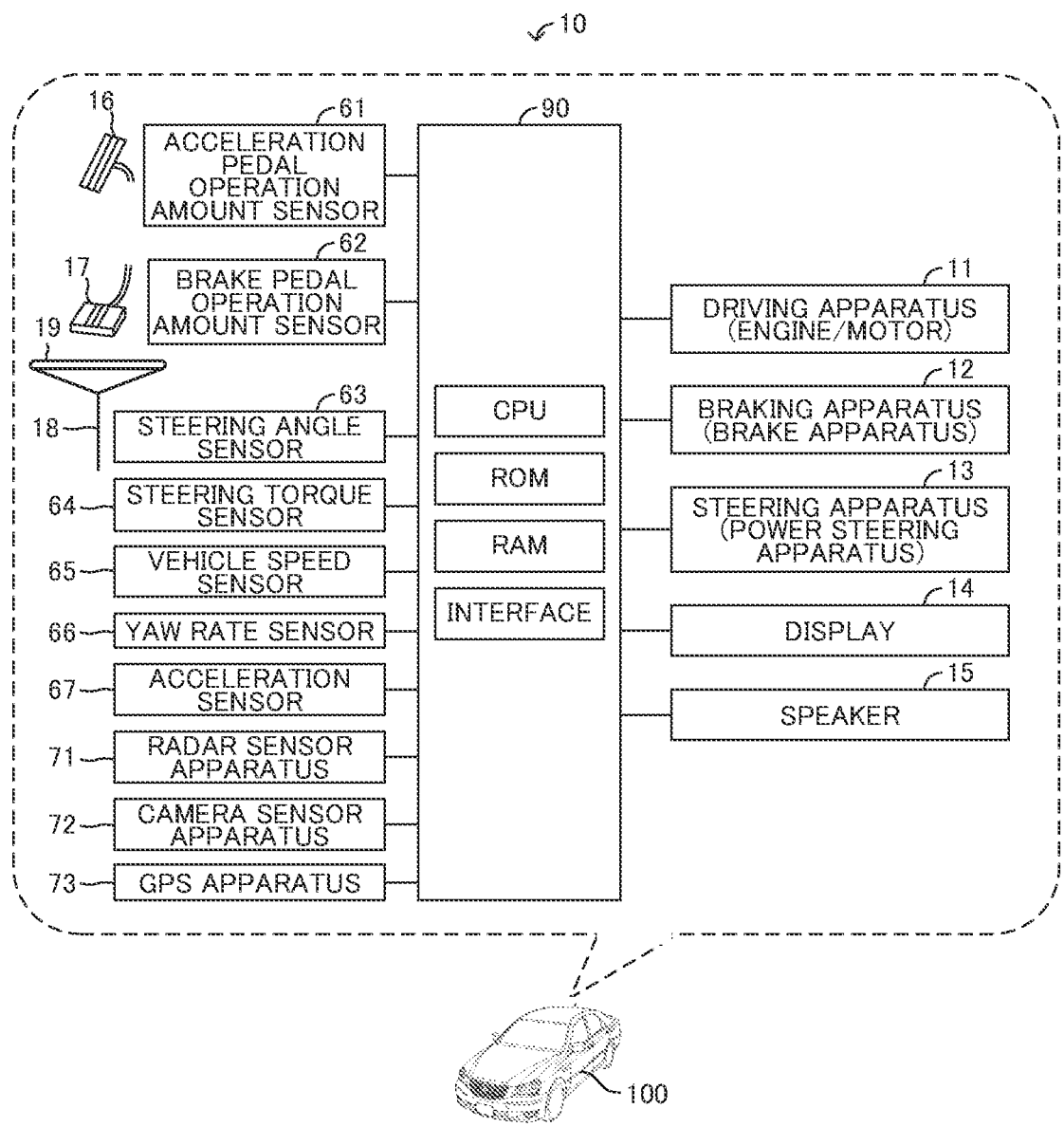
FIG. 1 is a view showing a vehicle control apparatus according to an embodiment of the invention and an own vehicle installed with the vehicle control apparatus.

Below, a vehicle control apparatus according to an embodiment of the invention will be described with reference to the drawings. As shown in FIG. 1, the vehicle control apparatus 10 according to the embodiment of the invention is installed on the own vehicle 100.

As shown in FIG. 1, the vehicle control apparatus 10 includes an ECU 90. ECU stands for electronic control unit. The ECU 90 includes a micro-computer as a main component. The micro-computer includes a CPU, a ROM, a RAM, a non-volatile memory, and an interface. The CPU is configured or programmed to realize various functions by executing instructions, or programs, or routines stored in the ROM.

<Driving Apparatus, etc.>

A driving apparatus 11, a braking apparatus 12 (or a brake apparatus), and a steering apparatus 13 (or a power steering apparatus) are installed on the own vehicle 100.

The driving apparatus 11 generates a driving force (or a driving torque) for moving the own vehicle 100 and applies the generated driving force to the own vehicle 100 (in particular; driven wheels of the own vehicle 100). The driving apparatus 11 is, for example, an internal combustion engine and/or an electric motor The driving apparatus 11 is electrically connected to the ECU 90. The ECU 90 can control the driving force applied to the own vehicle 100 by controlling activations of the driving apparatus 11.

The braking apparatus 12 generates a braking force (or a braking torque) for braking the own vehicle 100 and applies the generated braking force to the own vehicle 100 (in particular, each of wheels of the own vehicle 100). The braking apparatus 12 is electrically connected to the ECU 90. The ECU 90 can control the braking force applied to the own vehicle 100 by controlling activations of the braking apparatus 12.

The steering apparatus 13 generates a steering force (or a steering torque) for steering the own vehicle 100 and applies the generated steering force to the own vehicle 100 (in particular, steered wheels of the own vehicle 100). The steering apparatus 13 is electrically connected to the ECU 90.

In addition, a display 14 and a speaker 15 are installed on the own vehicle 100. The display 14 and the speaker 15 are electrically connected to the ECU 90, The ECU 90 can display various images on the display 14 by sending various displaying commands to the display 14. Further; the ECU 90 can output sounds from the speaker 15 by sending various sound outputting commands to the speaker 15.

<Sensors, etc.>

In addition, various sensors and various sensor apparatuses are installed on the own vehicle 100. In this embodiment, the sensors include an acceleration pedal operation amount sensor 61, a brake pedal operation amount sensor 62, a steering angle sensor 63, a steering torque sensor 64, a vehicle speed sensor 65, a yaw rate sensor 66, and an acceleration sensor 67. Further, the sensor apparatuses include a radar sensor apparatus 71 and a camera sensor apparatus 72.

The acceleration pedal operation amount sensor 61 is electrically connected to the ECU 90, The ECU 90 acquires an operation amount of an acceleration pedal 16 as an acceleration pedal operation amount AP, based on information sent from the acceleration pedal operation amount sensor 61. The ECU 90 controls the activations of the driving apparatus 11 to apply the driving force depending on the acquired acceleration pedal operation amount AP from the driving apparatus 11 to the own vehicle 100.

The brake pedal operation amount sensor 62 is electrically connected to the ECU 90. The ECU 90 acquires an operation amount of a brake pedal 17 as a brake pedal operation amount BP, based on information sent from the brake pedal operation amount sensor 62. The ECU 90 controls the activations of the braking apparatus 12 to apply the braking force depending on the acquired brake pedal operation amount BP from the braking apparatus 12 to the own vehicle 100.

The steering angle sensor 63 is electrically connected to the ECU 90. The ECU 90 acquires a rotation angle of a steering wheel 19 of the own vehicle 100 with respect to a neutral position as a steering angle SA, based on information sent from the steering angle sensor 63, In addition, the ECU 90 acquires a steering angle rate dSA, based on the acquired steering angle SA. The steering angle rate dSA is a change amount of the steering angle SA per unit time or a change rate of the steering angle SA.

The steering torque sensor 64 is electrically connected to the ECU 90, The ECU 90 acquires a torque input by a driver of the own vehicle 100 to a steering shaft 18 via the steering wheel 19 as a driver input torque TQdriver, based on information sent from the steering torque sensor 64.

The vehicle speed sensor 65 is electrically connected to the ECU 90. The ECU 90 acquires rotation speeds Vrot of the wheels of the own vehicle 100, based on information sent from the vehicle speed sensor 65. Then, the ECU 90 acquires a moving speed of the own vehicle 100 as a vehicle speed SPD, based on the acquired rotation speeds Vrot of the wheels.

In addition, the ECU 90 calculates an assist steering torque TQassist to be applied to the steering shaft 18 from the steering apparatus 13, based on the acquired steering angle SA, the acquired driver input torque TQdriver, and the vehicle speed SPD. The ECU 90 controls activations of the steering apparatus 13 to output the calculated assist steering torque TQassist from the steering apparatus 13. The assist steering torque TQassist assists a steering operation to the steering wheel 19 performed by the driver.

The yaw rate sensor 66 is electrically connected to the ECU 90. The ECU 90 acquires a yaw rate YR of the own vehicle 100, based on information sent from the yaw rate sensor 66.

The acceleration sensor 67 is electrically connected to the ECU 90. In this embodiment, the acceleration sensor 67 is a gyroscope sensor. The acceleration sensor 67 detects an acceleration of the own vehicle 100 in a yaw direction, an acceleration of the own vehicle 100 in a roll direction, and an acceleration of the own vehicle 100 in a pitch direction and sends information on the detected accelerations to the ECU 90. The ECU 90 acquires information on the accelerations of the own vehicle 100 in the yaw, roll, and pitch directions as acceleration information INF_G, based on the information sent from the acceleration sensor 67.

The acceleration sensor 67 may include a longitudinal acceleration sensor and a lateral acceleration sensor. In this case, the acceleration sensor 67 detects a longitudinal acceleration Gx of the own vehicle 100 and a lateral acceleration Gy of the own vehicle 100 and sends information on the detected accelerations Gx and Gy to the ECU 90. The ECU 90 acquires information on the longitudinal and lateral accelerations Gx and Gy of the own vehicle 100 as the acceleration information INF_G, based on the information sent from the acceleration sensor 67.

The radar sensor apparatus 71 includes radar sensors. The radar sensor apparatus 71 is electrically connected to the ECU 90. The radar sensor apparatus 71 detects a situation ahead of the own vehicle 100 by the radar sensors and sends information on the detected situation to the ECU 90. The ECU 90 acquires information on the situation ahead of the own vehicle 100 as radar information INF_R, based on the information sent from the radar sensor apparatus 71.

The camera sensor apparatus 72 includes at least one camera. The camera sensor apparatus 72 is electrically connected to the ECU 90. The camera sensor apparatus 72 takes images by the camera and sends information on the taken images ahead of the own vehicle 100 to the ECU 90. The ECU 90 acquires information on the images ahead of the own vehicle 100 taken by the camera as camera information INF_C, based on the information sent from the camera sensor apparatus 72.

In addition, the ECU 90 recognizes a left white line LM_L and a right white line LM_R which define a moving lane LN_1 of the own vehicle 100 (see FIG. 2A) or an end of a road (a road end) on which the own vehicle 100 moves, based on the camera information INF_C. The white lines LM_L and LM_R are lane markings which define the moving lane LN_1 of the own vehicle 100.

Figure 2A:
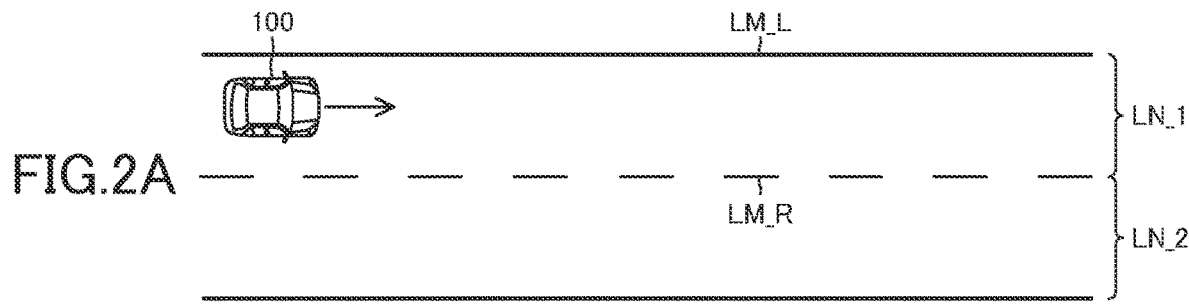
FIG. 2A is a view showing white lines defining a moving lane of the own vehicle.
Figure 2B:
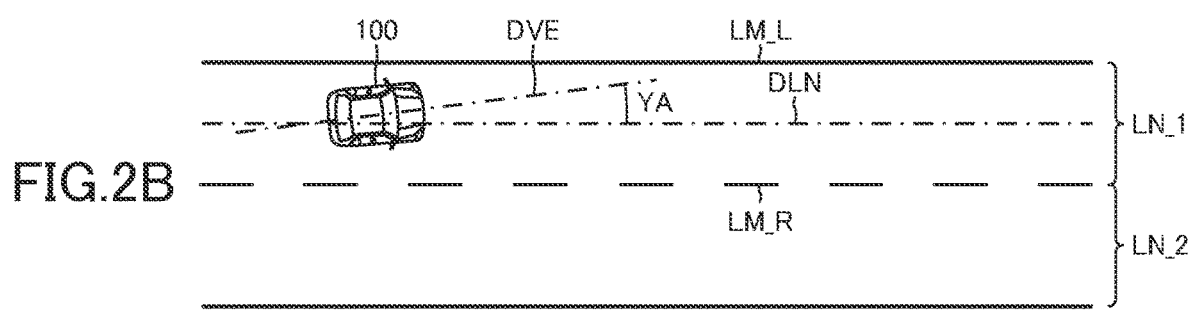
FIG. 2B is a view showing a yaw angle of the own vehicle when the own vehicle directs leftward.
Figure 2C:
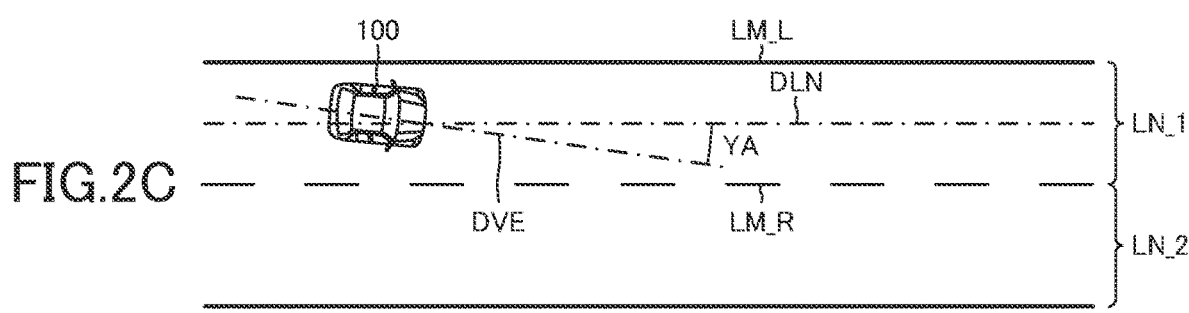
FIG. 2C is a view showing the yaw angle of the own vehicle when the own vehicle directs rightward.

Then, the ECU 90 acquires a yaw angle YA, based on information on the recognized left and right white lines LM_L and LM_R or the road end. As shown in FIG. 2A and FIG. 2B, the yaw angle YA is an angle between (i) a direction DLN in which the moving lane LN_1 of the own vehicle 100 extends and (ii) a direction DVE along a longitudinal center line of the own vehicle 100. In FIG. 2, a lane LN_2 is an oncoming lane next to the moving lane LN_1 of the own vehicle 100.

Hereinafter, the moving lane LN_1 of the own vehicle 100 will be referred to as "own vehicle lane LN_1", and the radar information INF_R and/or the camera information INF_C will be referred to as "own vehicle forward information INF_F".

<GPS Apparatus>

In addition, a GPS apparatus 73 is installed on the own vehicle 100. The GPS apparatus 73 is electrically connected to the ECU 90. The GPS apparatus 73 receives so-called GPS signals and sends the received GPS signals to the ECU 90. The ECU 90 recognizes a position of the own vehicle 100, based on the received GPS signals. In addition, the ECU 90 acquires the yaw angle YA, using the received GPS signals.

<Summary of Operations>

Next, a summary of operations of the vehicle control apparatus 10 will be described. When (i) there is an object such as a human or a bicycle ahead of the own vehicle 100, and (ii) the vehicle control apparatus 10 determines that the own vehicle 100 probably collides with or contact to the object, the vehicle control apparatus 10 executes an alerting control of informing a driver of the own vehicle 100 of a fact that the own vehicle 100 probably collides with or contact to the object.

Then, when a probability that the own vehicle 100 collides with the object ahead of the own vehicle 100, increases to a certain level, the vehicle control apparatus 10 executes a steering control of steering the own vehicle 100 for avoiding a collision of the own vehicle 100 with the object. Then, after the collision of the own vehicle 100 with the object has been avoided, the vehicle control apparatus 10 terminates executing the steering control. In this embodiment, the steering control includes a first steering control and a second steering control. Below, the alerting control and the steering control will be described in detail.

Figure 3A:
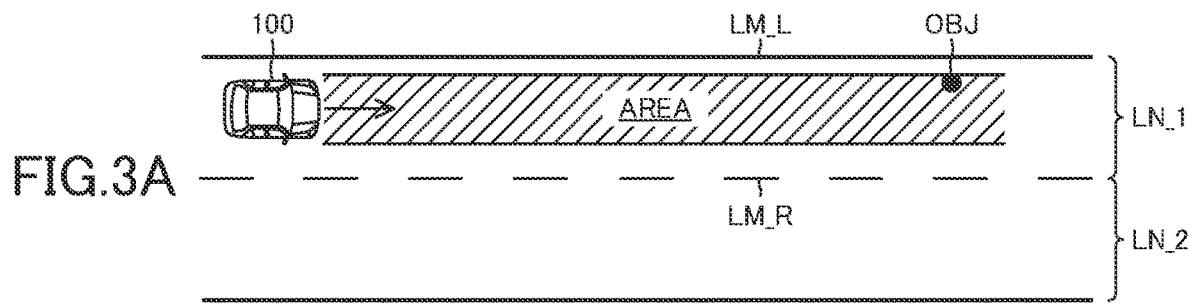
FIG. 3A is a view showing a situation that there is an object ahead of the own vehicle.

The vehicle control apparatus 10 determines whether there is an object OBJ in an area AREA on a moving route of the own vehicle 100 (see FIG. 3A), based on the own vehicle forward information INF_F. The vehicle control apparatus 10 uses a known technique to determine whether there is an object OBJ in the area AREA on the moving route of the own vehicle 100. The moving route of the own vehicle 100 is a route which the own vehicle 100 moves assuming that the steering angle of the own vehicle 100 is maintained. The area AREA of the moving route of the own vehicle 100 is an area having a width equal to a width of the own vehicle 100 centered at the moving route of the own vehicle 100. Hereinafter, the area AREA will be referred to as "own vehicle moving area AREA".

When the vehicle control apparatus 10 determines that there is the object OBJ in the own vehicle moving area AREA, the vehicle control apparatus 10 acquires a predicted reaching time TTC, based on the radar information INF_R and the vehicle speed SPD. The predicted reaching time TTC is a time predicted to take for the own vehicle 100 to reach the object OBJ. The vehicle control apparatus 10 acquires the predicted reaching time TTC, based on (i) a distance between the own vehicle 100 and the object OBJ and (ii) the vehicle speed SPD. While the vehicle control apparatus 10 determines that there is the object OBJ in the own vehicle moving area AREA, the vehicle control apparatus 10 acquires the predicted reaching time TTC with a predetermined calculation cycle CYC.

Figure 3B:
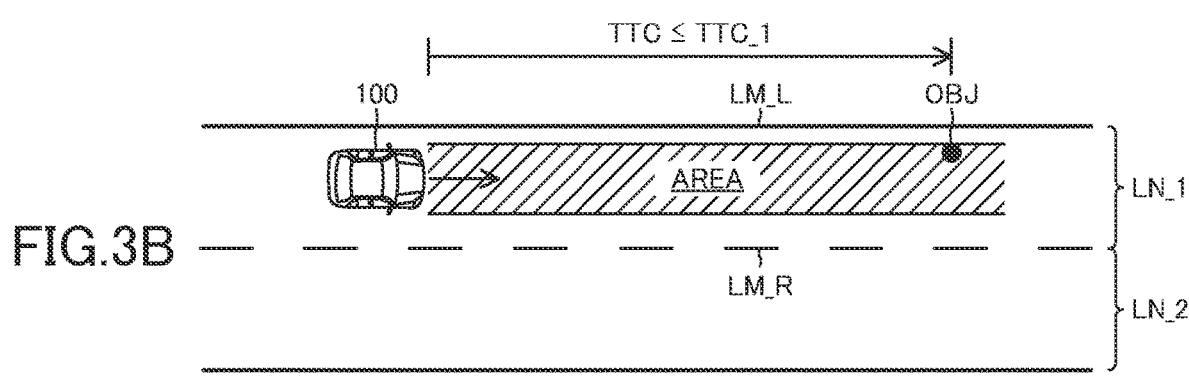
FIG. 3B is a view showing a situation that the own vehicle has approached the object.

When the vehicle speed SPD is constant, the predicted reaching time TTC decreases as the own vehicle 100 approaches the object OBJ. As shown in FIG. 3B, when (i) the own vehicle 100 approaches the object OBJ, and (ii) the predicted reaching time TTC decreases to a predetermined time TTC_1, the vehicle control apparatus 10 determines that an alerting start condition is satisfied and starts executing the alerting control. The alerting control is a control of performing at least one of (i) a process of displaying an alerting image on the display 14 and (ii) a process of outputting alerting sound from the speaker 15. Hereinafter, the predetermined time TTC_1 will be referred to as "alerting start threshold time TTC_1".

When the vehicle control apparatus 10 detects that the driver operates the steering wheel 19 in a direction that the own vehicle 100 passes by the object OBJ without colliding with the object OBJ before the predicted reaching time TTC decreases to a predetermined time TTC_2 shorter than the alerting start threshold time TTC_1 after the vehicle control apparatus 10 starts executing the alerting control, the vehicle control apparatus 10 determines that a first steering control start condition is satisfied and starts executing the first steering control.

Figure 3C:
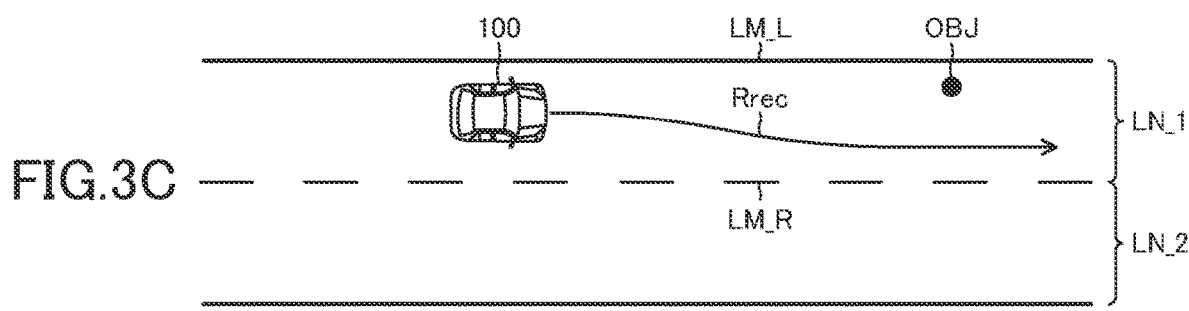
FIG. 3C is a view showing a recommended route.

The first steering control is a control of determining a recommended route Rrec recommended for moving the own vehicle 100 with avoiding the collision of the own vehicle 100 with the object OBJ by calculation as shown in FIG. 3C, and increasing and decreasing the assist steering torque TQassist, depending on the driver input torque TQdriver so as to move the own vehicle 100, keeping a distance from the recommended route Rrec within a predetermined distance. In other words, the first steering control is a control of controlling the assist steering torque TQassist so as to move the own vehicle 100, keeping the distance from the recommended route Rrec within the predetermined distance in consideration of the driver input torque TQdriver without ignoring the driver input torque TQdriver.

In this embodiment, the vehicle control apparatus 10 determines a route for moving the own vehicle 100 so as to pass by the object OBJ with avoiding the collision of the own vehicle 100 with the object OBJ and moving the own vehicle 100 within the own vehicle lane LN_1 (i.e., without moving the own vehicle 100 out of the own vehicle lane LN_1) as the recommended route Rrec.

Further, in this embodiment, the vehicle control apparatus 10 determines a route depending on the operation to the steering wheel 19 performed by the driver as the recommended route Rrec. In particular, the vehicle control apparatus 10 determines a route passing a right side of the object OBJ as the recommended route Rrec when the driver rotates the steering wheel 19 clockwise. On the other hand, the vehicle control apparatus 10 determines a route passing a left side of the object OBJ as the recommended route Rrec when the driver rotates the steering wheel 19 counterclockwise.

The vehicle control apparatus 10 cancels executing the first steering control when the vehicle control apparatus 10 cannot set the recommended route Rrec, for example, due to a fact that the own vehicle lane LIN_1 of the own vehicle 100 is too narrow.

In addition, the vehicle control apparatus 10 cancels executing the first steering control when the driver input torque TQdriver becomes equal to or greater than a relatively large predetermined steering torque TQ_th while the vehicle control apparatus 10 executes the first steering control.

It should be noted that in this embodiment, the vehicle control apparatus 10 determines that an alerting termination condition is satisfied and terminates executing the alert control when the vehicle control apparatus 10 starts executing the first steering control.

On the other hand, when the vehicle control apparatus 10 does not detect that the driver operates the steering wheel 19 in the direction that the own vehicle 100 passes by the object OBJ without colliding with the object OBJ before the predicted reaching time TTC decreases to the predetermined time TTC_2 (the second steering control start time TTC_2) shorter than the alerting start threshold time TTC_1 after the vehicle control apparatus 10 starts executing the alerting control, the vehicle control apparatus 10 determines that a second steering control start condition is satisfied and starts executing the second steering control.

Figure 3D:
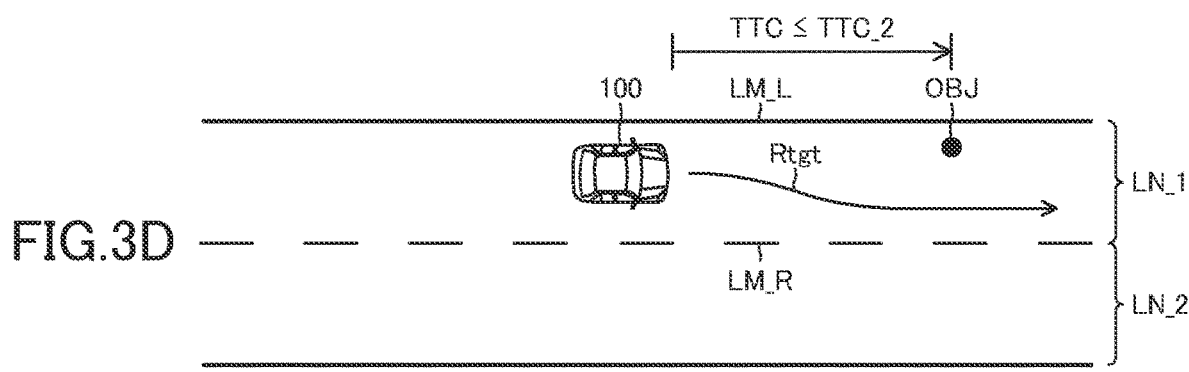
FIG. 3D is a view showing a target route.

The second steering control is a control of determining a target route Rtgt for moving the own vehicle 100 with avoiding the collision of the own vehicle 100 with the object OBJ by calculation as shown in FIG. 3D, and controlling the assist steering torque TQassist so as to move the own vehicle 100 along the target route Rtgt. In other words, the second steering control is a control of controlling the assist steering torque TQassist so as to move the own vehicle 100 along the target route Rtgt with ignoring the driver input torque TQdriver.

In this embodiment, the vehicle control apparatus 10 determines a route for moving the own vehicle 100 so as to pass by the object OBJ with avoiding the collision of the own vehicle 100 with the object OBJ and moving the own vehicle 100 within the own vehicle lane (i.e., without moving the own vehicle 100 out of the own vehicle lane LN_1) as the target route Rtgt. The target route Rtgt is a route passing the right or left side of the object OBJ, depending on a position of the object OBJ in the own vehicle lane LN_1.

The vehicle control apparatus 10 cancels executing the second steering control when the vehicle control apparatus 10 cannot set the target route Rtgt, for example, due to the face that the own vehicle lane LN_1 of the own vehicle 100 is too narrow.

In addition, the vehicle control apparatus 10 cancels executing the second steering control when the driver input torque TQdriver becomes equal to or greater than the relatively large predetermined steering torque TQ_th while the vehicle control apparatus 10 executes the second steering control.

It should be noted that in this embodiment, the vehicle control apparatus 10 determines that the alerting termination condition is satisfied and terminates executing the alert control when the vehicle control apparatus 10 starts executing the second steering control.

<Termination of Steering Control>

After the vehicle control apparatus 10 starts executing the first steering control, the vehicle control apparatus 10 monitors whether a steering control termination condition is satisfied. The steering control termination condition is satisfied when (i) the yaw angle VA becomes equal to or smaller than a predetermined yaw angle YA_th, and (ii) the steering angle SA becomes equal to or smaller than a predetermined steering angle SA_th. In particular, the steering control termination condition is satisfied when (i) an absolute value of the yaw angle YA becomes equal to or smaller than the predetermined yaw angle YA_th, and (ii) an absolute value of the steering angle SA becomes equal to or smaller than the predetermined steering angle SA_th. The predetermined yaw angle YA_th and the predetermined steering angle SA_th are set to values which keep a turning behavior of the own vehicle 100 just after executing the first or second steering control is terminated within a permitted turning behavior range, respectively.

The vehicle control apparatus 10 continues executing the first steering control as long as the steering control termination condition is not satisfied. On the other hand, when the steering control termination condition is satisfied, the vehicle control apparatus 10 terminates executing the first steering control.

Also, after the vehicle control apparatus 10 starts executing the second steering control, the vehicle control apparatus 10 monitors whether the steering control termination condition is satisfied. The vehicle control apparatus 10 continues executing the second steering control as long as the steering control termination condition is not satisfied. On the other hand, when the steering control termination condition is satisfied, the vehicle control apparatus 10 terminates executing the second steering control.

Thereby, executing the first or second steering control is terminated when (i) the yaw angle YA becomes equal to or smaller than the predetermined yaw angle YA_th, and (ii) the steering angle SA becomes equal to or smaller than the predetermined steering angle SA_th after executing the first or second steering control is started. That is, executing the first or second steering control is terminated with ensuring that the own vehicle 100 moves along the own vehicle lane LN_1 even if executing the first or second steering condition is terminated.

Figure 4A:
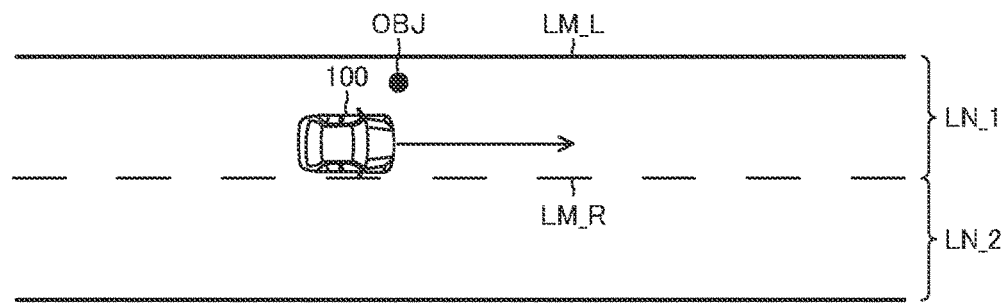
FIG. 4A is a view showing a situation that executing a steering control is terminated.
Figure 4B:
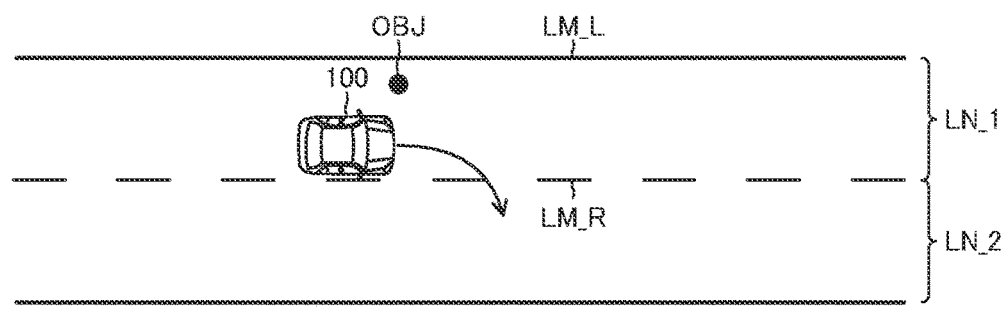
FIG. 4B is a view showing a situation that the own vehicle moves in a direction toward an adjacent lane.
Figure 4C:
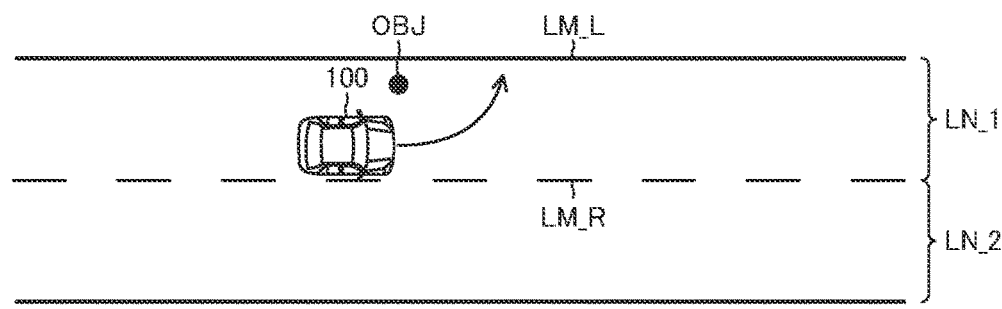
FIG. 4C is a view showing a situation that the own vehicle moves in a direction opposite to the adjacent lane.

Thereby, as shown in FIG. 4A, the own vehicle 100 surely moves along the own vehicle lane LN_1 after executing the first or second steering control is terminated. Thus, it can be prevented that the own vehicle 100 moves in a direction toward the oncoming lane LN_2 (see FIG. 3) next to the own vehicle lane or the adjacent lane next to the own vehicle lane or in a direction opposite to the oncoming lane LA_2 next to the own vehicle lane or the adjacent lane next to the own vehicle lane LN_1.

The steering control termination condition may be determined to be satisfied when (i) the yaw angle YA becomes equal to or smaller than the predetermined yaw angle YA_th, (ii) the steering angle SA becomes equal to or smaller than the predetermined steering angle SA_th, and (iii) the steering angle rate dSA becomes equal to or smaller than a predetermined steering angle rate dSA_th after executing the first or second steering control is started. In particular, the steering control termination condition may be determined to be satisfied when (i) the absolute value of the yaw angle YA becomes equal to or smaller than the predetermined yaw angle YA_th, (ii) the absolute value of the steering angle SA becomes equal to or smaller than the predetermined steering angle SA_th, and (iii) an absolute value of the steering angle rate dSA becomes equal to or smaller than the predetermined steering angle rate dSA_th after executing the first or second steering control is started. The predetermined steering angle rate dSA_th is set to a value which keeps the turning behavior of the own vehicle 100 just after executing the first or second steering control is terminated within the permitted turning behavior range.

Thereby, a condition that the steering angle rate dSA is equal to or smaller than the predetermined steering angle rate dSk_th, is further considered as a condition of terminating executing the first or second steering control. Thus, it can be surely prevented that the own vehicle 100 moves in the direction toward the oncoming lane LN_2 next to the own vehicle lane LN_1 or the adjacent lane next to the own vehicle lane LN_1 or in a direction opposite to the oncoming lane LN_2 next to the own vehicle lane LA_1 or the adjacent lane next to the own vehicle lane LN_1.

Further, the steering control termination condition may be determined to be satisfied when (i) the yaw angle VA becomes equal to or smaller than the predetermined yaw angle YA_th, (ii) the steering angle SA becomes equal to or smaller than the predetermined steering angle SA_th, (iii) the steering angle rate dSA becomes equal to or smaller than the predetermined steering angle rate dSA_th, and (iv) the yaw rate YR becomes equal to or smaller than a predetermined yaw rate YR_th after executing the first or second steering control is started. In particular, the steering control termination condition may be determined to be satisfied when (i) the absolute value of the yaw angle VA becomes equal to or smaller than the predetermined yaw angle YA_th, (ii) the absolute value of the steering angle SA becomes equal to or smaller than the predetermined steering angle SA_th, (iii) the absolute value of the steering angle rate dSA becomes equal to or smaller than the predetermined steering angle rate dSA_th, and (iv) an absolute value of the yaw rate YR becomes equal to or smaller than the predetermined yaw rate YR_th after executing the first or second steering control is started. The predetermined yaw rate YR_th is set to a value which keeps the turning behavior of the own vehicle 100 just after executing the first or second steering control is terminated within the permitted turning behavior range.

Thereby, a condition that the yaw rate YR is equal to or smaller than the predetermined yaw rate YR_th, is further considered as the condition of terminating executing the first or second steering control. Thus, it can be surely prevented that the own vehicle 100 moves in the direction toward the oncoming lane LN_2 next to the own vehicle lane LN_1 or the adjacent lane next to the own vehicle lane LN_1 or in a direction opposite to the oncoming lane LN_2 next to the own vehicle lane LN_1 or the adjacent lane next to the own vehicle lane LN_1.

<Specific Operations>

Next, specific operations of the vehicle control apparatus 10 will be described. The CPU of the ECU 90 of the vehicle control apparatus 10 is configured or programmed to execute a routine shown in FIG. 5 each time a predetermined time elapses. Thus, at a predetermined timing, the CPU starts executing a process from a step 500 in FIG. 5 and proceeds with the process to a step 510 to execute a routine shown in FIG. 6.

Figure 6:
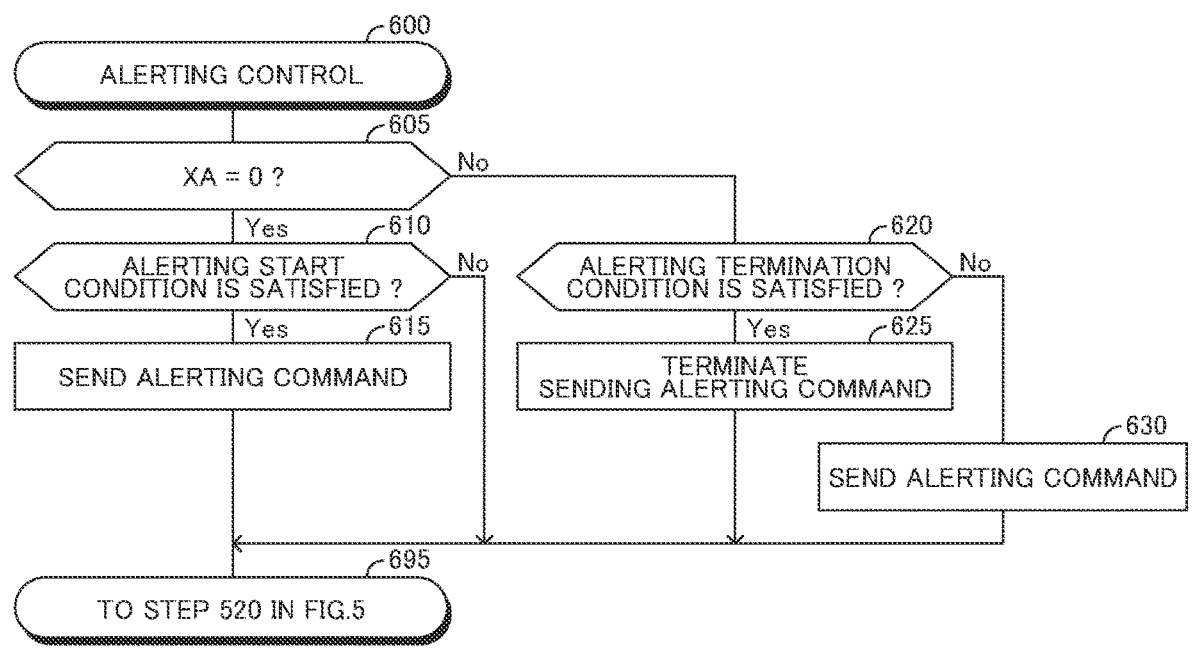
FIG. 6 is a view showing a flowchart of a routine executed by the vehicle control apparatus according to the embodiment of the invention.

The CPU starts executing a process of the routine shown in FIG. 6 from a step 600 and proceeds with the process to a step 605 to determine whether a value of an alerting executing flag XA is "0". The value of the alerting executing flag XA is set to "1" when the CPU starts executing the alerting control. On the other hand, the value of the alerting executing flag XA is set to "0" when the CPU terminates executing the alerting control.

When the CPU determines "Yes" at the step 605 (i.e., the alerting control is not executed), the CPU proceeds with the process to a step 610 to determine whether the alerting start condition is satisfied.

When the CPU determines "Yes" at the step 610, the CPU proceeds with the process to a step 615 to send an alerting command to the speaker 15. Thereby, outputting the alerting sound from the speaker 15 is started. Then, the CPU proceeds with the process to a step 520 in FIG. 5 via a step 695.

Figure 5:
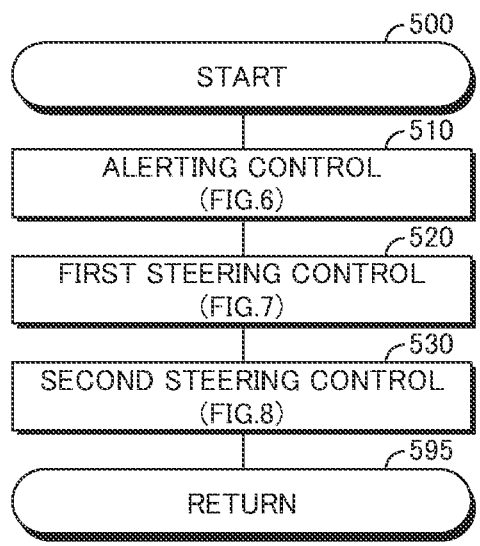
FIG. 5 is a view showing a flowchart of a routine executed by the vehicle control apparatus according to the embodiment of the invention.

On the other hand, when the CPU determines "No" at the step 610, the CPU proceeds with the process to the step 520 in FIG. 5 via the step 695.

When the CPU determines "No" at the step 605 (i.e., the alerting control is executed), the CPU proceeds with the process to a step 620 to determine whether the alerting termination condition is satisfied.

When the CPU determines "Yes" at the step 620, the CPU proceeds with the process to a step 625 to terminate sending the alerting command to terminate executing the alerting control. Then, the CPU proceeds with the process to the step 520 in FIG. 5 via the step 695.

On the other hand, when the CPU determines "No" at the step 620, the CPU proceeds with the process to a step 630 to send the alerting command to the speaker 15. Thereby, outputting the alerting sound from the speaker 15 is continued. Then, the CPU proceeds with the process to the step 520 in FIG. 5 via the step 695.

Figure 7:
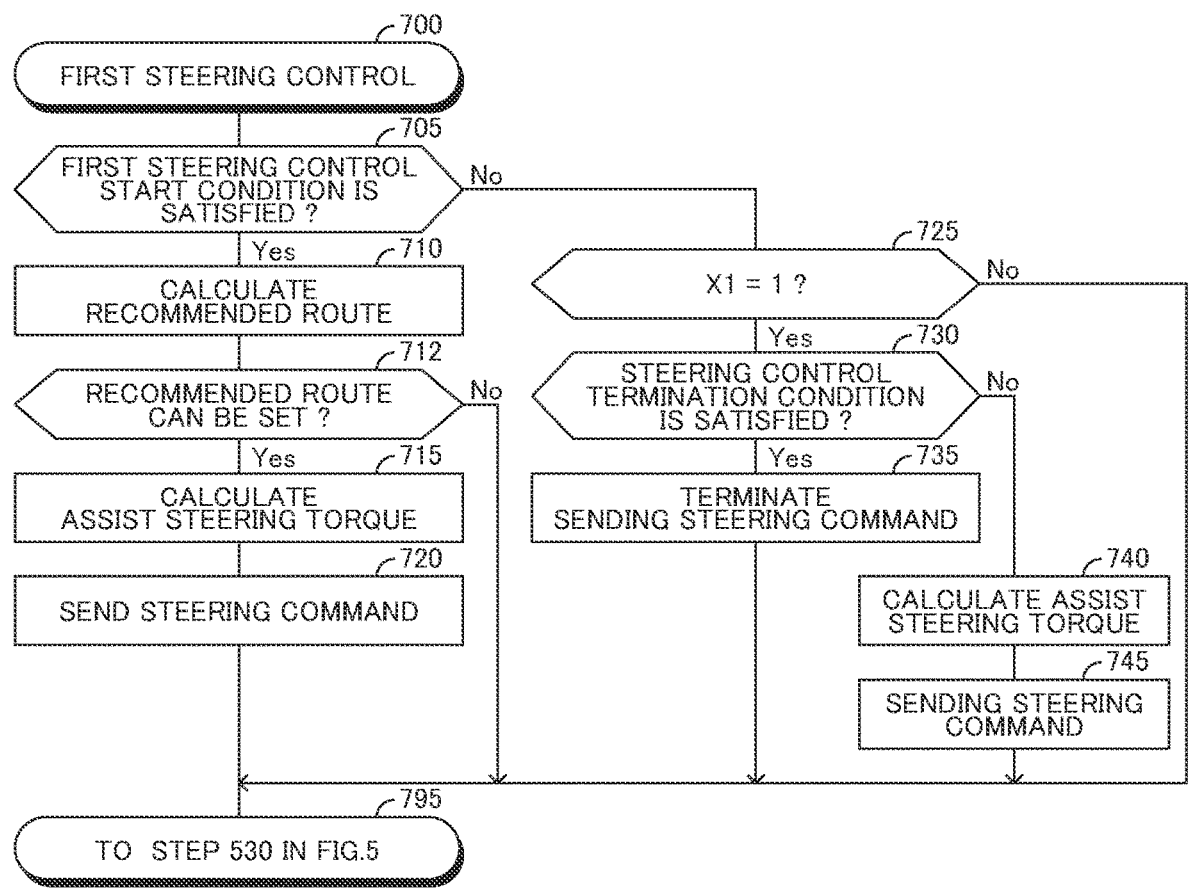
FIG. 7 is a view showing a flowchart of a routine executed by the vehicle control apparatus according to the embodiment of the invention.

When the CPU proceeds with the process to the step 520 in FIG. 5, the CPU executes a routine shown in FIG. 7. The CPU starts executing a process of the routine shown in FIG. 7 from a step 700 and proceeds with the process to a step 705 to determine whether the first steering control start condition is satisfied.

When the CPU determines "Yes" at the step 705, the CPU proceeds with the process to a step 710 to calculate the recommended route Rrec. Next, the CPU proceeds with the process to a step 712 to determines whether the recommended route Rrec can be set.

When the CPU determines "Yes" at the step 712, the CPU proceeds with the process to a step 715 to calculate the assist steering torque TQassist, based on the recommended route Rrec, the steering angle SA, the driver input torque TQdriver, and the vehicle speed SPD. Next, the CPU proceeds with the process to a step 720 to send a steering command to the steering apparatus 13 for outputting the assist steering torque TQassist calculated at the step 715 from the steering apparatus 13. Thereby, the assist steering torque TQassist calculated at the step 715 is output from the steering apparatus 13. Then, the CPU proceeds with the process to a step 530 in FIG. 5 via a step 795.

On the other hand, when the CPU determines "No" at the step 712, the CPU proceeds with the process to the step 530 in FIG. 5 via the step 795, In this case, executing the first steering control is substantially cancelled.

When the CPU determines "No" at the step 705 the first steering control has been executed or is not executed), the CPU proceeds with the process to a step 725 to determine whether a value of a first steering executing flag X1 is "1". The value of the first steering executing flag X1 is set to "1" when the CPU starts executing the first steering control. On the other hand, the value of the first steering executing flag X1 is set "0" when the CPU terminates executing the first steering control.

When the CPU determines "Yes" at the step 725, the CPU proceeds with the process to a step 730 to determine whether the steering control termination condition is satisfied.

When the CPU determines "Yes" at the step 730, the CPU proceeds with the process to a step 735 to terminate sending the steering command to terminate executing the first steering control. Then, the CPU proceeds with the process to the step 530 in FIG. 5 via the step 795.

On the other hand, when the CPU determines "No" at the step 730, the CPU proceeds with the process to a step 740 to calculate the assist steering torque TQassist, based on the recommended route Rrec, the steering angle SA, the driver input torque TQdriver, and the vehicle speed SPD. Next, the CPU proceeds with the process to a step 745 to send the steering command to the steering apparatus 13 for outputting the assist steering torque TQassist calculated at the step 740 from the steering apparatus 13. Thereby, the assist steering torque TQassist calculated at the step 740 is output from the steering apparatus 13. Then, the CPU proceeds with the process to the step 530 in FIG. 5 via the step 795.

When the CPU determines "No" at the step 725, the CPU proceeds with the process to the step 530 in FIG. 5 via the step 795.

Figure 8:
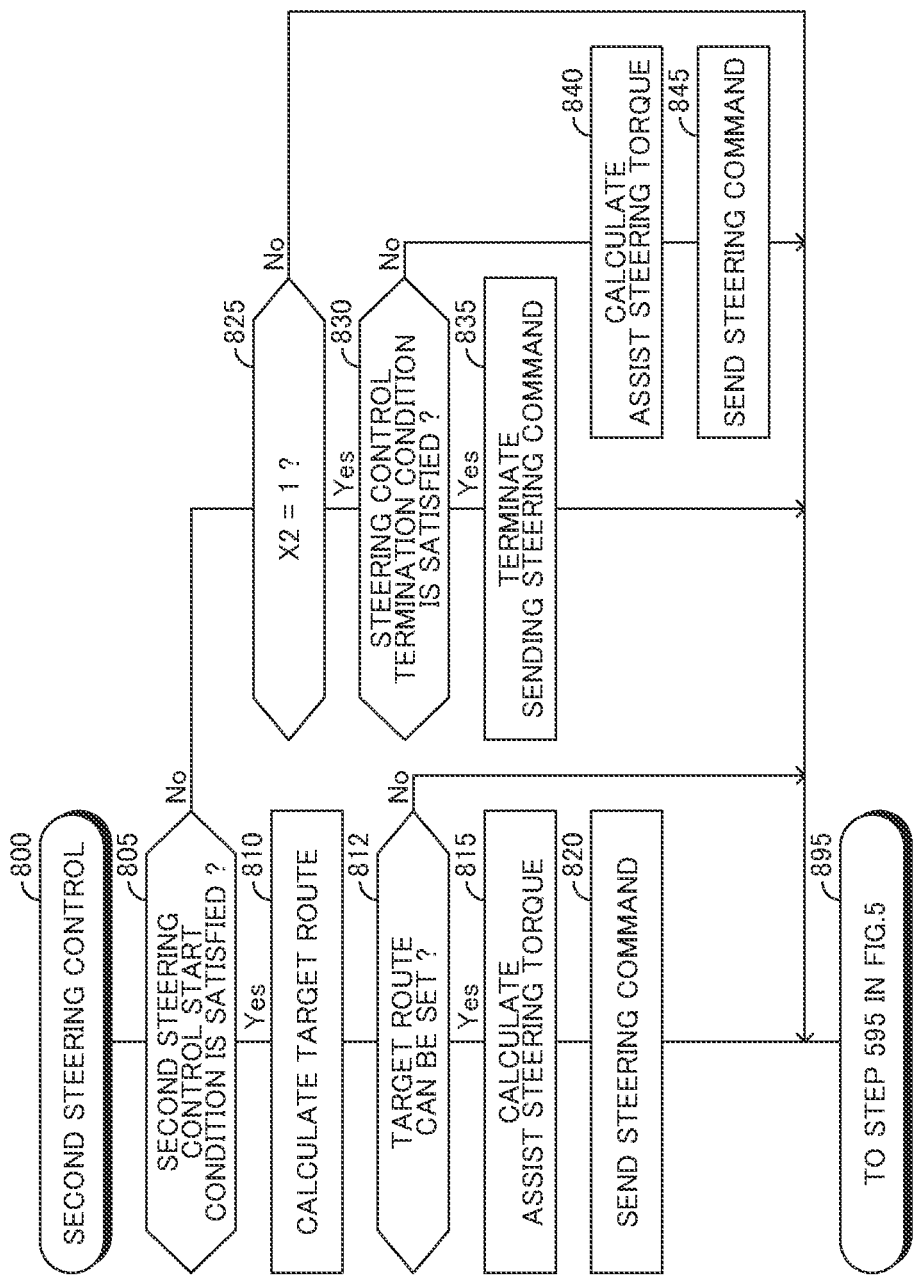
FIG. 8 is a view showing a flowchart of a routine executed by the vehicle control apparatus according to the embodiment of the invention.

When the CPU proceeds with the process to the step 530 in FIG. 5, the CPU execute a routine shown in FIG. 8. The CPU starts executing a process of the routine shown in FIG. 8 from a step 800 and proceeds with the process to a step 805 to determine whether the second steering control start condition is satisfied.

When the CPU determines "Yes" at the step 805, the CPU proceeds with the process to a step 810 to calculate the target route Rtgt. Next, the CPU proceeds with the process to a step 812 to determine whether the target route Rtgt can be set.

When the CPU determines "Yes" at the step 812, the CPU calculates the assist steering torque TQassist, based on the target route Rtgt, the steering angle SA, and the vehicle speed SPD. Next, the CPU proceeds with the process to a step 820 to send the steering command to the steering apparatus 13 for outputting the assist steering torque TQassist calculated at the step 815 from the steering apparatus 13. Thereby, the assist steering torque TQassist calculated at the step 815 is output from the steering apparatus 13. Then, the CPU proceeds with the process to a step 595 in FIG. 5 via a step 895 to terminate executing this routine once.

On the other hand, when the CPU determines "No" at the step 812, the CPU proceeds with the process to the step 895 in FIG. 5 via the step 895 to terminate executing this routine once. In this case, executing the second steering control is substantially cancelled.

When the CPU determines "No" at the step 805 the second steering control has been executed or is not executed), the CPU proceeds with the process to a step 825 to determine whether a value of a second steering executing flag X2 is "1". The value of the second steering executing flag X2 is set to "1" when the CPU starts executing the second steering control. On the other hand, the value of the second steering executing flag X2 is set to "0" when the CPU terminates executing the second steering control.

When the CPU determines "Yes" at the step 825, the CPU proceeds with the process to a step 830 to determine whether the steering control termination condition is satisfied.

When the CPU determines "Yes" at the step 830, the CPU proceeds with the process to a step 835 to terminate sending the steering command to terminate executing the second steering control. Then, the CPU proceeds with the process to the step 595 in FIG. 5 via the step 895 to terminate executing this routine once.

On the other hand, when the CPU determines "No" at the step 830, the CPU proceeds with the process to a step 840 to calculate the assist steering torque TQassist, based on the target route Rtgt, the steering angle SA, and the vehicle speed SPD. Next, the CPU proceeds with the process to a step 845 to send the steering command to the steering apparatus 13 to output the assist steering torque TQassist calculated at the step 840 from the steering apparatus 13. Thereby, the assist steering torque TQassist calculated at the step 840 is output from the steering apparatus 13. The, the CPU proceeds with the process to the step 595 in FIG. 5 via the step 895 to terminate executing this routine once.

When the CPU determines "No" at the step 825, the CPU proceeds with the process to the step 595 in FIG. 5 via the step 895 to terminate executing this routine once.

The specific operations of the vehicle control apparatus 10 have been described.

It should be noted that the invention is not limited to the aforementioned embodiments, and various modifications can be employed within the scope of the invention.

What is claimed is:

1. A vehicle control apparatus, comprising:
a sensor which detects own vehicle forward information on a situation ahead of an own vehicle; and
an electronic control unit configured to:
determine that an alerting start condition is satisfied when there is an object in an area of a route which the own vehicle moves and a first estimated time-to-collision is less than a first threshold, based on the own vehicle forward information;
execute an alerting control when the electronic control unit determines that the alerting start condition is satisfied;
determine that a control start condition is satisfied when the alerting control is being executed and a second estimated time-to-collision is less than a second threshold, based on the own vehicle forward information, wherein the second threshold is smaller than the first threshold; and
execute a steering control of steering the own vehicle to increase a yaw angle of the own vehicle with respect to a moving lane of the own vehicle and decrease the yaw angle to avoid a collision of the own vehicle with the object when the electronic control unit determines that the control start condition is satisfied,
wherein the electronic control unit is configured to:
determine that a control termination condition is satisfied when the yaw angle becomes equal to or smaller than a predetermined yaw angle, and a steering angle of the own vehicle becomes equal to or smaller than a predetermined steering angle after the electronic control unit starts steering the own vehicle to decrease the yaw angle in executing the steering control; and
terminate executing the steering control when the control termination condition is satisfied.

2. The vehicle control apparatus as set forth in claim 1, wherein the control termination condition includes a condition that a change rate of the steering angle of the own vehicle becomes equal to or smaller than a predetermined change rate after the electronic control unit starts steering the own vehicle to decrease the yaw angle in executing the steering control.

3. The vehicle control apparatus as set forth in claim 1, wherein the control termination condition includes a condition that a yaw rate of the own vehicle becomes equal to or smaller than a predetermined yaw rate after the electronic control unit starts steering the own vehicle to decrease the yaw angle in executing the steering control.

4. The vehicle control apparatus as set forth in claim 1, wherein the electronic control unit is configured to cancel executing the steering control when a steering torque input to a steering wheel of the own vehicle by a driver of the own vehicle becomes equal to or greater than a predetermined steering torque while the steering control is executed.

5. The vehicle control apparatus as set forth in claim 1, wherein the electronic control unit is configured to:
execute the steering control to set a moving route of the own vehicle for avoiding the collision of the own vehicle with the object as a recommended route when the control start condition is satisfied; and
execute the steering control to assist operations applied by a driver of the own vehicle to a steering wheel of the own vehicle to move the own vehicle along the recommended route.

6. The vehicle control apparatus as set forth in claim 5, wherein the recommended route extends in the moving lane of the own vehicle.

7. The vehicle control apparatus as set forth in claim 6, wherein the electronic control unit is configured to cancel executing the steering control when the electronic control unit cannot set the recommended route.

8. The vehicle control apparatus as set forth in claim 1, wherein the electronic control unit is configured to:
execute the steering control to set a moving route of the own vehicle for avoiding the collision of the own vehicle with the object as a target route when the control start condition is satisfied; and execute the steering control to move the own vehicle along the target route.

9. The vehicle control apparatus as set forth in claim 8, wherein the target route extends in the moving lane of the own vehicle.

10. The vehicle control apparatus as set forth in claim 9, wherein the electronic control unit is configured to cancel executing the steering control when the electronic control unit cannot set the target route.

11. The vehicle control apparatus as set forth in claim 1, wherein to execute the alerting control comprises to perform at least one of displaying an alerting image on a display of the own vehicle and outputting an alerting sound from a speaker of the own vehicle.

12. The vehicle control apparatus as set forth in claim 1, wherein the electronic control unit is configured to cancel executing the alerting control when the electronic control unit determines that the control start condition is satisfied.

13. The vehicle control apparatus as set forth in claim 5, wherein the electronic control unit is configured to determine the moving route of the own vehicle for avoiding the collision of the own vehicle with the object based at least on the operations applied by the driver of the own vehicle.

14. The vehicle control apparatus as set forth in claim 8, wherein the electronic control unit is configured to determine the moving route of the own vehicle for avoiding the collision of the own vehicle with the object by ignoring operations applied by a driver of the own vehicle.

* * * * *